US005280212A

United States Patent [19]

Oba

[11] Patent Number: 5,280,212

[45] Date of Patent: Jan. 18, 1994

[54] BRUSH ASSEMBLY FOR USE WITH A DIRECT CURRENT MACHINE

[76] Inventor: Hiroshi Oba, 1197, Okasaki, Kosai-shi, Shizuoka-ken 431-04, Japan

[21] Appl. No.: 3,740

[22] Filed: Jan. 13, 1993

[30] Foreign Application Priority Data

May 25, 1992 [JP] Japan ........................ 4-132885

[51] Int. Cl.[5] .............................. H02K 13/00

[52] U.S. Cl. ........................ 310/248; 310/233; 310/239; 310/242

[58] Field of Search ............ 310/248, 233, 249, 55, 310/251-253, 239-242, 244-245, 297, 220, 221, 177

[56] References Cited

U.S. PATENT DOCUMENTS

| | | | |
|---|---|---|---|
| 1,342,583 | 6/1920 | Borgner | 310/239 |
| 2,989,656 | 6/1961 | Herbst | 310/239 |
| 4,324,997 | 4/1982 | Taylor | 310/248 |
| 4,554,476 | 11/1985 | Gotoh | 310/239 |
| 4,876,475 | 10/1989 | Smith | 310/239 |
| 4,977,345 | 12/1990 | Toperzer | 310/242 |
| 4,983,873 | 1/1991 | Tanaka et al. | 310/248 |

FOREIGN PATENT DOCUMENTS 2164244 6/1990 Japan .
4285450 10/1992 Japan .

OTHER PUBLICATIONS

A part of a Japanese Publication "Applications and Developments of Materials for New Compact motors", Dec. 25, 1985 in Japan.

*Primary Examiner*—R. Skudy
*Attorney, Agent, or Firm*—Stetina and Brunda

[57] ABSTRACT

A direct current machine, such as a motor or a dynamo, has a commutator. The commutator has a contact surface which includes a generally cylindrical contact surface. The commutator is rotatable around an axis. A brush assembly of the direct current machine includes at least two brushes. Each brush has a distal surfaces which is engagable to a contact surface of the commutator. A brush holder movably holds the brushes toward the commutator. A clearance is defined between the brush and the brush holder. Each spring urges the corresponding brush against the contact surface of the commutator. Further, the spring urges the brush to be off-set toward the front side of a rotational direction of the commutator, within the brush holder.

9 Claims, 7 Drawing Sheets

Fig.8 (Prior Art)
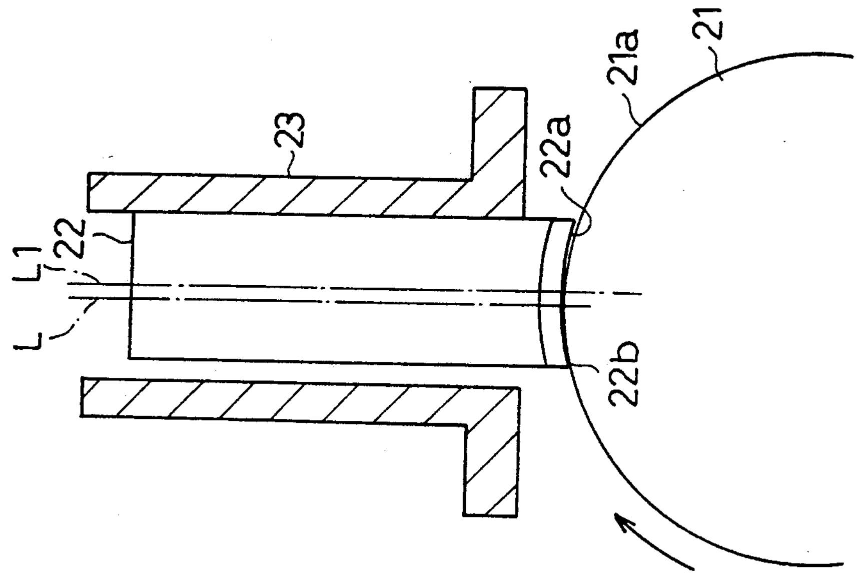
Fig.9 (Pior Art)
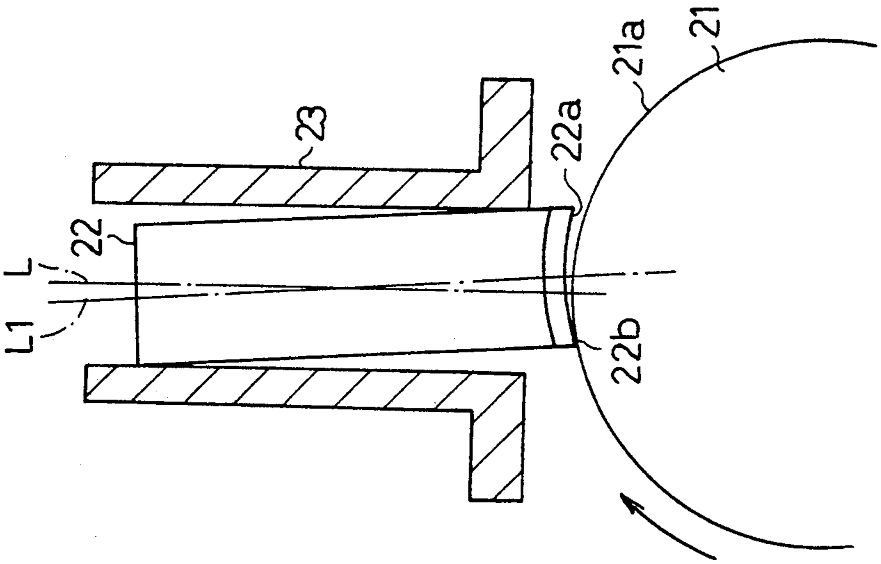

BRUSH ASSEMBLY FOR USE WITH A DIRECT CURRENT MACHINE

BACKGROUND OF THE INVENTION

This application claims the priority of Japanese Patent application No. 4-132885 filled May 25, 1992.

FIELD OF THE INVENTION

The present invention relates to a direct current machine, such as a motor or a dynamo, having a brush assembly and a commutator. More specifically, it pertains to a direct current machine having a brush assembly which slidably contacts the commutator under the brush.

DESCRIPTION OF THE RELATED ART

In a conventional direct current motor of this type, a brush holder 23 is secured to a case (not shown) of a motor, as shown in FIG. 6. Each brush holder 23 accommodates a brush 22, which is arranged generally perpendicular to the axial line of a commutator 21. A sliding contact surface *22a*, which is formed at the distal end portion of each brush 22, is urged against a peripheral surface *21a* of the commutator 21, by the urging force of a spring (not shown).

As shown in FIG. 7, the sliding contact surface *22a* is inclined with respect to the axial line of the commutator 21, i.e., to the peripheral surface *21a*. Therefore, when the brushes 22 are first installed, a distal edge of the sliding contact surface *22a* tangentially contacts the surface *21a* of the commutator 21. Each surface *22a* of the brush 22 has a generally equal curvature with respect to that of the surface *21a* of the commutator 21, in order to increase the contacting area between the brush 22 and the commutator 21. The portion indicated by the arrow A of the brush 22 starts wearing gradually, with the rotational movement of the commutator 21, as shown in FIG. 7.

However, there is a clearance between the brush 22 and the brush holder 23, as shown in FIGS. 8 and 9. Thus, each brush 22 is caused to shift transversely, or to incline within the brush holder 23, due to sliding friction against the commutator 21, while the commutator 21 is revolving. As a result, the central line L1 of the width of the brush 22, does not coincide with the central line L of the brush holder 23. The central portion of the surface *22a* of the brush 22, corresponding to the central line L1 of the width of the brush 22, no longer makes a slidable contact with the surface *21a* of the commutator 21. For example, as shown in FIG. 9, a corner *22b* of the brush 22 makes a slidable contact with the commutator 21. In this case, noise is generated.

FIG. 10 shows the wear progressing process in which a contact position of surface *22a* of the brush 22 against the peripheral surface *21a* changes with time, in response to the wear of the brush 22. The central line L1 of the width of the brush 22 does not coincide with a central line L2 of the sliding contact surface *22a*. The reason being that a contact area of the sliding contact surface *22b* against the peripheral surface *21a* gradually increases, due to the wear of the brush 22. At the same time, the central portion of the surface *22a* of the brush 22 tends to make a slidable contact with the surface *21a* of the commutator 21. Therefore, the central portion of the surface *22a* mainly wears out. As a result, in a conventional motor, a slidable contact position between the surface *22a* of the brush 22 and the commutator 21 is difficult to maintain in the fixed position. Therefore, the resulting shortcome is that the output characteristics of the conventional motor is easily caused to fluctuate.

In an attempt to overcome this disadvantage, Japanese Unexamined Patent Publication No. 2-164244 discloses a direct current motor. In the motor of the above-described publication, as shown in FIG. 11, a curvature of the surface *22a* of the brush 22 is set larger than a radius r of the commutator 21. The sliding contact surface *22a* is formed as an arch with a curvature.

Therefore, as shown in FIG. 11, even if the brush 22 were shifted transversely within the brush holder 23, the corner *22b* of the brush 22 does not make slidable contact with the surface *21a* of the commutator 21. As shown in FIG. 12, even if the brush 22 were inclined within the brush holder 23, the corner *22b* of the brush 22 does not make slidable contact with the surface *21a* of the commutator 21.

However, in the direct current motor described in this publication (2-164244), when the brush 22 is shifted transversely within the brush holder 23, the surface *22a* of the brush 22 does not make slidable contact with the surface *21a* of the commutator 21, at the central portion thereof, with respect to the central line L1 of the width of the brush 22. Therefore, a slidable contacting position of the surface *22a* of the brush 22 with respect to the surface *22a* of the commutator 21 is difficult to maintain in the fixed position. As a result, the fluctuation of the motor characteristic is still unresolved.

In addition to the above, as shown in FIG. 13, it is known that the brush 22 is accommodated within the brush holder 23, which is inclined by a range of 10 to 20 degrees, with respect to a line passing through the center of the commutator 21. In this conventional motor, the brush 22 is forced to contact the inner wall surface of the holder 23, by means of a frictional force generated with respect to the commutator 21, while the commutator 21 is revolving. However, even in this case, the fluctuation of characteristic of the motor still occurs for similar reasons as indicated.

SUMMARY OF THE INVENTION

Accordingly, it is an object of the present invention to provide a direct current machine, which has the capability to prevent noise generation and fluctuation of characteristic of the motor, generated by the brush when it slidably contacts the commutator.

To achieve the foregoing and other objects and in accordance with the purpose of the present invention, the new and improved direct current machine has a generally cylindrical contact surface made around a peripheral surface thereof, and a commutator which is rotatable around a single axial line. A brush assembly of the machine includes a brush, which has a distal end surface that contacts a contact surface of the commutator. A brush holder slidably holds the brush toward the commutator. A clearance is defined between the brush and the brush holder. An urging mechanism urges the brush against the contact surface of the commutator. This urging mechanism further urges the brush to be off-set toward the front side of a rotational direction of the commutator, within the brush holder.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments, together with the accompanying drawings in which:

FIG. 8 is a cross sectional view illustrating a conventional brush urged against an inner wall surface of the brush holder;

FIG. 9 is a cross sectional view illustrating the conventional brush being inclined within the brush holder;

DETAILED DESCRIPTION OF THE PREFERRED EMBODIMENTS

A first preferred embodiment of a direct current motor according to the present invention will now be described referring to FIGS. 1 through 3.

Figure 1:
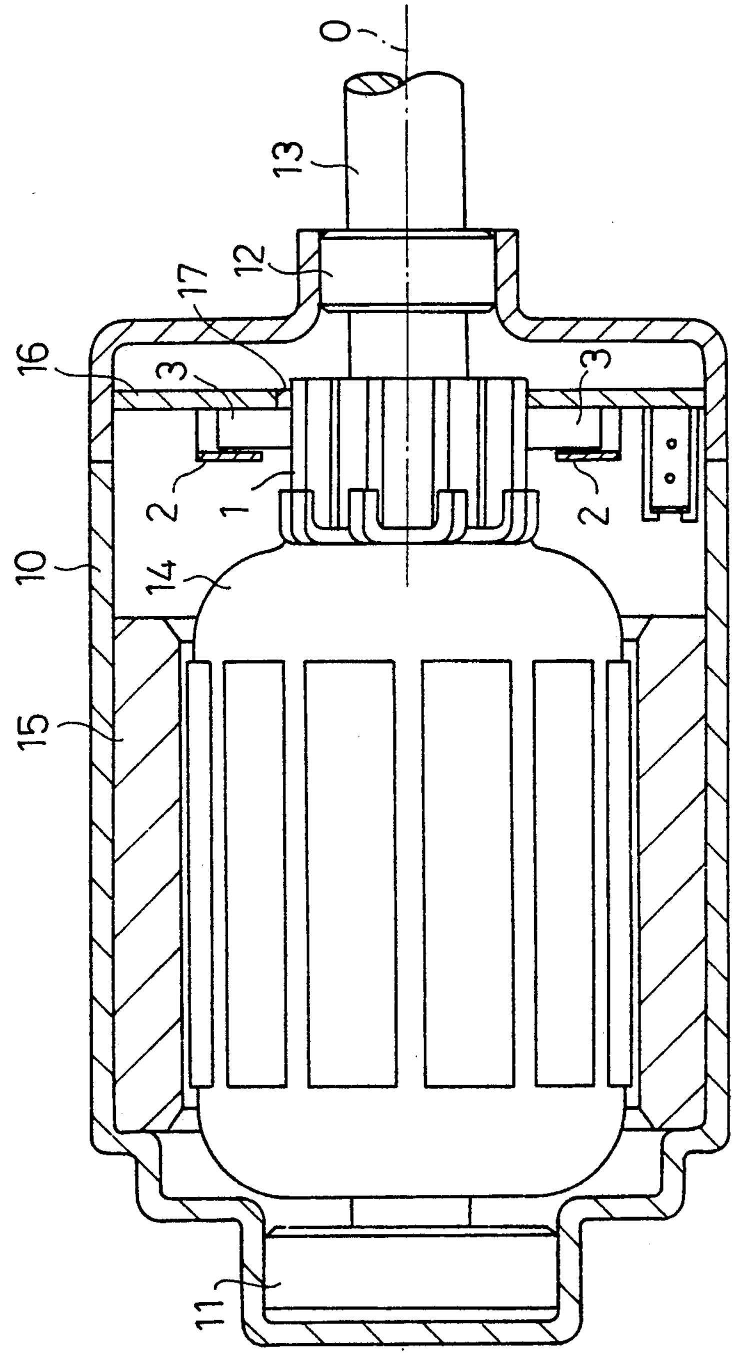
FIG. 1 is a cross sectional view of a direct current motor according to a first embodiment of the present invention.

As shown in FIG. 1, a rotary shaft 13 is rotatably supported by a pair of bearings 11 and 12 within a case 10 of the direct current motor. An armature 14 and a commutator 1 are integrally rotatably secured to the rotary shaft 13. A plurality of magnets 15 are equiangularly secured to an inner peripheral surface of the case 10, around the peripheral surface of the armature 14. A support plate 16 is provided within the case 10 in the vicinity of the commutator 1.

A portion of the commutator 1 is inserted into a through hole 17 formed in the support plate 16. A pair of brush holders 2, each of which has a substantially tubular form with a generally rectangular cross section, are attached to the support plate 16, around the peripheral surface of the commutator 1, and are separated from each other by a predetermined distance. As shown in FIG. 2, a central line L of the each brush holder 2 is set in a plane which includes a central line 0 of the commutator 1.

Each brush holder 2 accommodates a reciprocatably movable brush 3, which includes a generally square pole, along the central line L of the brush holder 2. A predetermined clearance is defined between the brush holder 2 and the brush 3. A spring 18 is attached to each brush holder 2 via attachment means 2*a*. This spring 18 is generally a flat spring, and is secured to the brush holder 2, via a proximal wound section 18*a*. A distal portion 18*b* of the spring 18 engages the outer distal surface of the brush 3.

Figure 2:
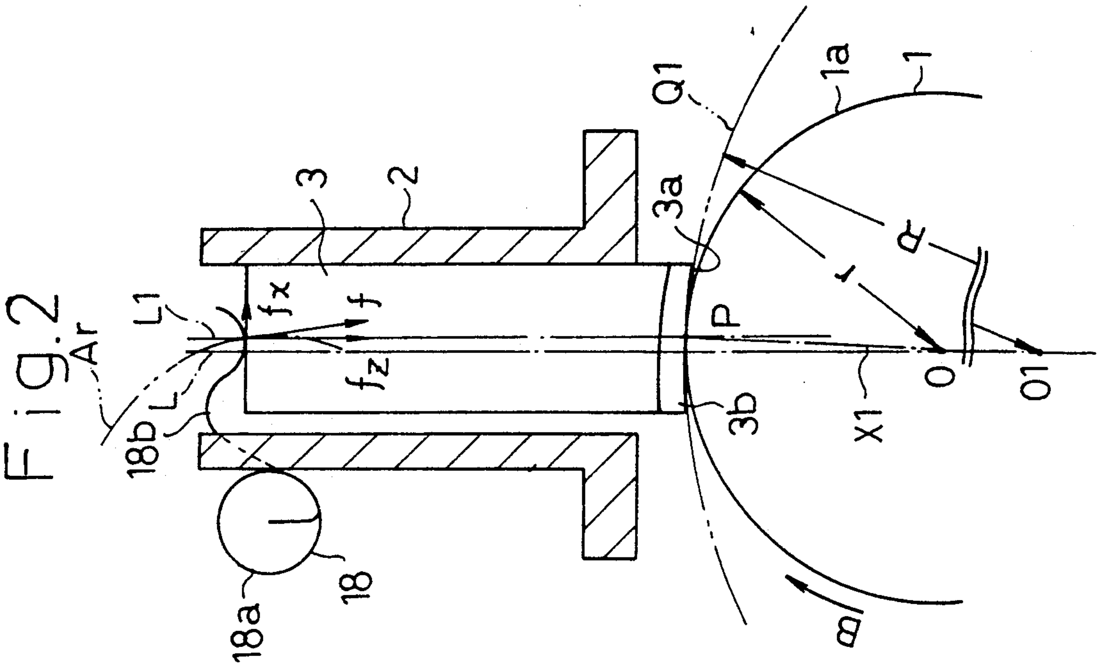
FIG. 2 is a cross sectional view illustrating a brush urged against an inner wall surface within a brush holder of the motor of FIG. 1.
Figure 3:
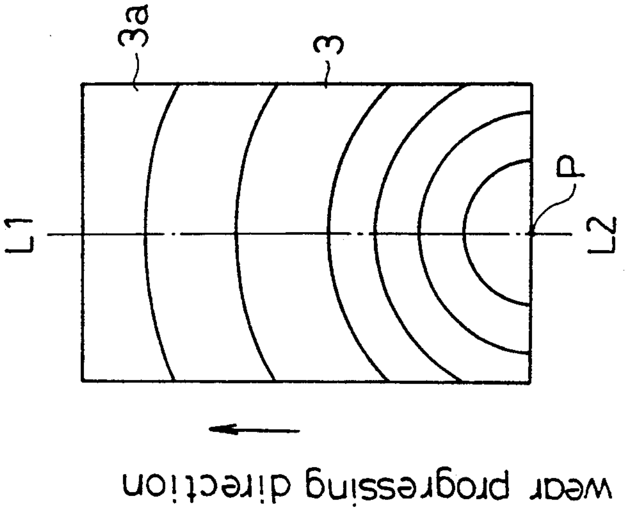
FIG. 3 illustrates a progressive wear process of the brush of the motor of FIG. 1.

The spring 18 urges the brush 3 against the commutator 1, under the force indicated by the arrow f, as shown in FIG. 2. More specifically, the brush 3 is urged against the commutator 1 under the force component fz of the urging force f, along the z direction. The brush 3 is also urged against one of inner side surfaces (an inner surface located in the right of FIG. 2) of the brush holder 2, under the force component fx of the urging force f, along the x direction. A sliding contact surface 3*a*, which contacts a peripheral surface 1*a* of the commutator 1, is formed at an inner distal portion of each brush 3. The contact surface 3*a* is inclined with respect to the surface 1*a* of the commutator 1. That is with respect to the central line 0 of the commutator 1.

Therefore, while the commutator 1 is rotating in the direction indicated by the arrow B, the brush 3 is urged against the inner wall surface located at the right side of the brush holder 2, under the friction caused by the rotation of the commutator 1 and the force component fx of the spring 18, along x direction. Therefore, the brush 3 is eccentrically retained at the right side with respect to the center line L of the brush holder 2, as shown in FIG. 2.

In this embodiment, the surface 3*a* of the brush 3 is formed along an arch Q1 (indicated by a double dotted line as shown in FIG. 2), which passes through a point P located on the inner distal end surface of the brush 3, lying on the central line L1 of the width of the brush 3. Further, a center 01 of the arch Q1 is located on an extended line of a line X1, which lies on a plane including the point P and the central line 0 of the commutator 1. The radius R of the arch Q1 is larger than the radius r of the commutator 1. Therefore, the surface 3*a* always slidably contacts the peripheral surface 1*a* of the commutator 1 on the central line L1 of the width of the brush 3.

According to this embodiment, as shown in FIG. 2, the brush 3 is kept at the position displaced transversely by the urging force of the spring 18, within the brush holder 2. As shown in FIG. 3, the central line L2 of the sliding contact surface 3*a* , which passes through the point P and the central line L1 of the width of the brush 3, coincide on the surface 3*a* of the brush 3. As the brush 3 becomes electrically charged, the rotary shaft 13, armature 14 and commutator 1 are integrally rotated in a direction shown by an arrow B. While the commutator 1 is rotating, the surface 3*a* of the brush 3 is always slidably contacted to the surface 1*a* of the commutator 1 on the central line L1 of the width of the brush 3. The sliding contact position therebetween is never out of the central line L2 of the sliding contact surface 3*a*.

As a result, the direct current motor can smoothly rotate. Therefore, the fluctuation of the motor characteristic is minimized. As the surface 3*a* of the brush 3 is formed along the arch which has a larger curvature of the surface 1*a*, the sliding contact between a corner 3*b* of the brush 3 and the surface 1*a* of the commutator 1 is averted, so that noise generation is minimized.

Figure 4:
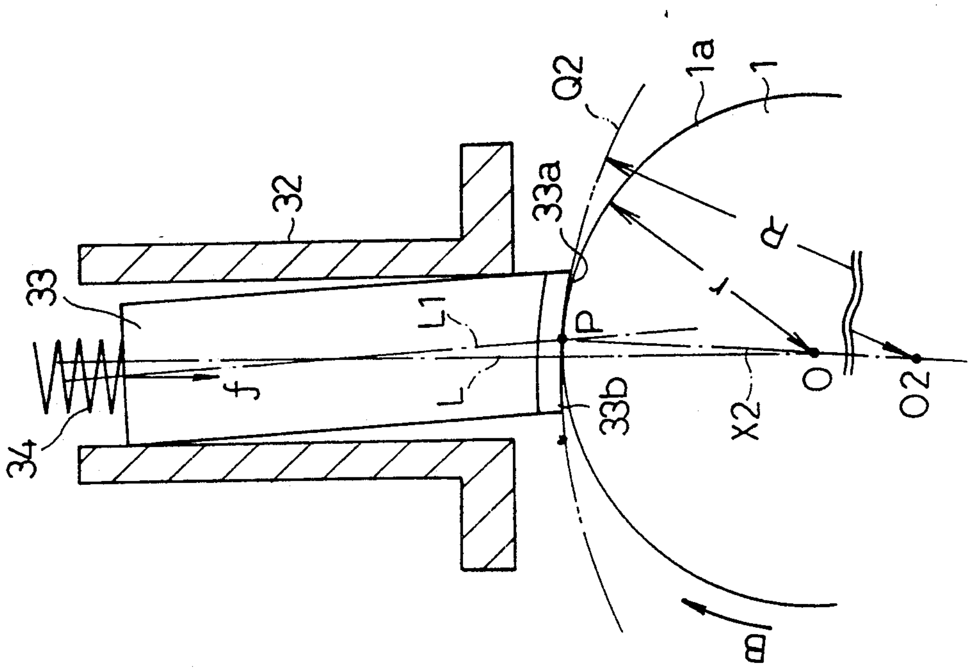
FIG. 4 is a cross sectional view illustrating the brush inclined within the brush holder of a direct current motor employed in a second embodiment according to the present invention.

A direct current motor employed in a second embodiment according to the present invention will now be described referring to FIG. 4, mainly emphasizing the difference relative to the first embodiment. In this second embodiment, a brush 33 is accommodated within a corresponding holder 32, which is kept in the tilted position and which is reciprocally movable. An inner distal portion of the brush 33 which is located in the front side of the rotational direction of the commutator 1 engages an inner peripheral surface of the holder 32, and an outer distal portion of the brush 33, which is located in the rear side of the rotational direction of the commutator 1, and which engages the other peripheral surface of the holder 32. A coil spring 34 is attached to the holder 32, which is disposed in parallel to the central line L of the holder 32. The spring 34 engages the outer end surface of the brush 33. The brush 33 is urged toward the center of the commutator 1, under the urging force f of the spring 34, and at the same time, the brush 33 is maintained in the inclined position.

Further, in this embodiment, the point P located on the central line L2 of the sliding contact surface 33*a* of the brush 33, is off-set toward the front side, in the rotational direction of the commutator 1, with respect to the central line L of the brush holder 32. The surface 33*a* is formed along an arch Q2 which has a central point O2 located on a line X2. The line X2 lies in a plane including the point P and the central line 0 of the commutator 1, and has a larger radius R than the radius r of the commutator 1.

Therefore, similar to the first embodiment, in the present embodiment, while the commutator 1 is rotating, the slidably contacting position between the brush 33 and the commutator 1 always coincides with the central line L1 of the sliding contact surface 33*a*. As a result, the direct current motor can smoothly rotate. Therefore, the fluctuation of the motor characteristic is averted. The sliding contact between a corner 33*b* of the brush 33 and the surface 1*a* of the commutator 1 is also averted, so that noise generation is controlled.

Figure 5:
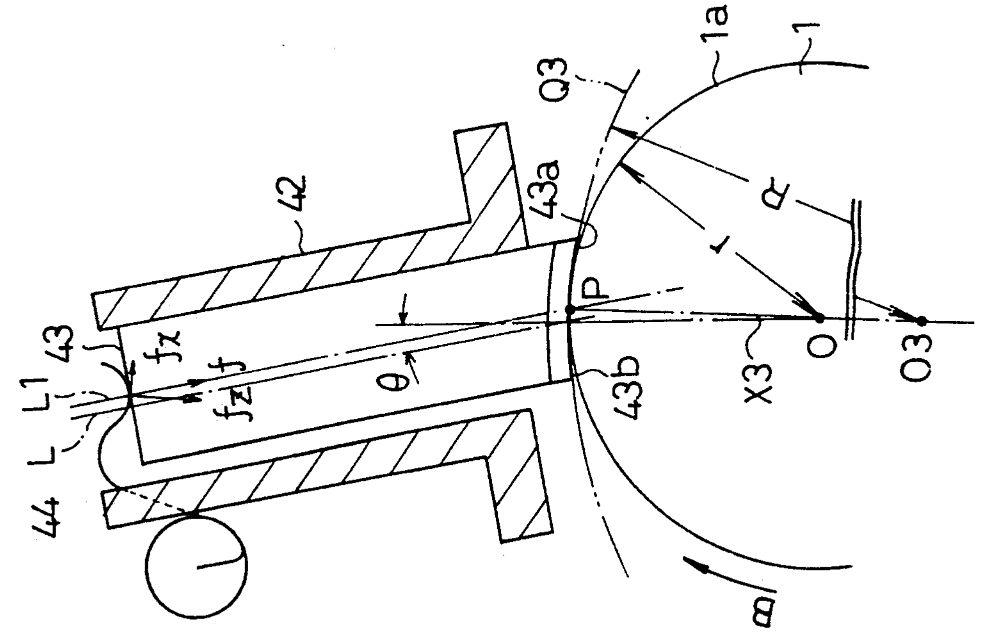
FIG. 5 is a cross sectional view of the brush and the brush holder of a direct current motor employed in a third embodiment according to the present invention.
Figure 6:
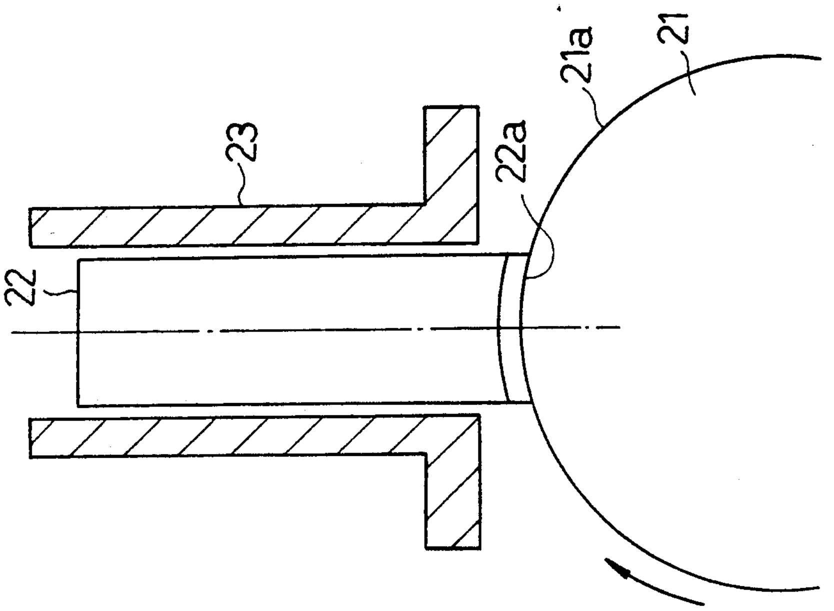
Fig.6 (Prior Art)
FIG. 6 is a cross sectional view of the brush and the others of a conventional direct current motor.
Figure 7:
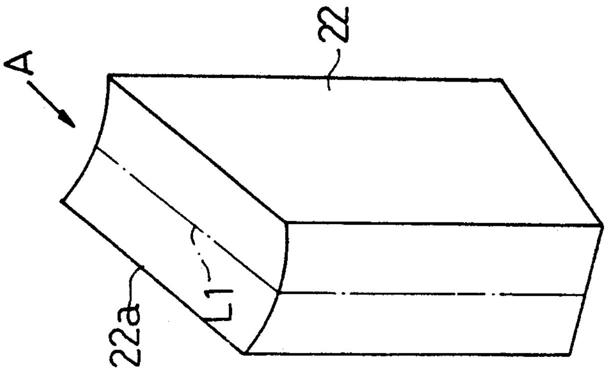
Fig.7 (Prior Art)
FIG. 7 is a perspective view of the brush employed in the motor of FIG. 6.
Figure 10:
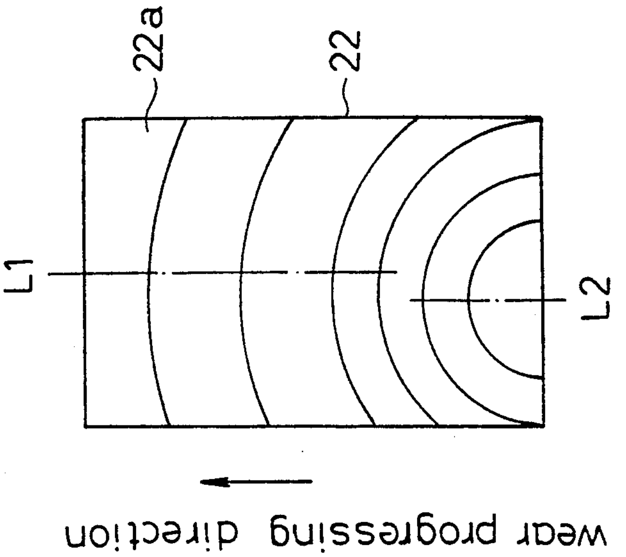
Fig.10 (Prior Art)
FIG. 10 illustrates a progressive wear process of the conventional brush.
Figure 11:
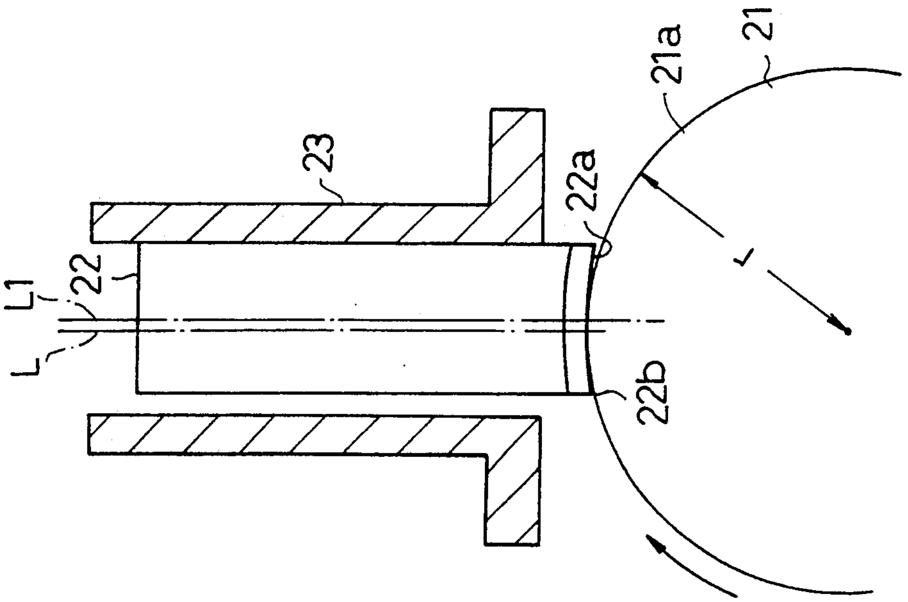
Fig.11 (Prior Art)
FIG. 11 is a cross sectional view illustrating another conventional brush being urged against the right surface of the brush holder.
Figure 12:
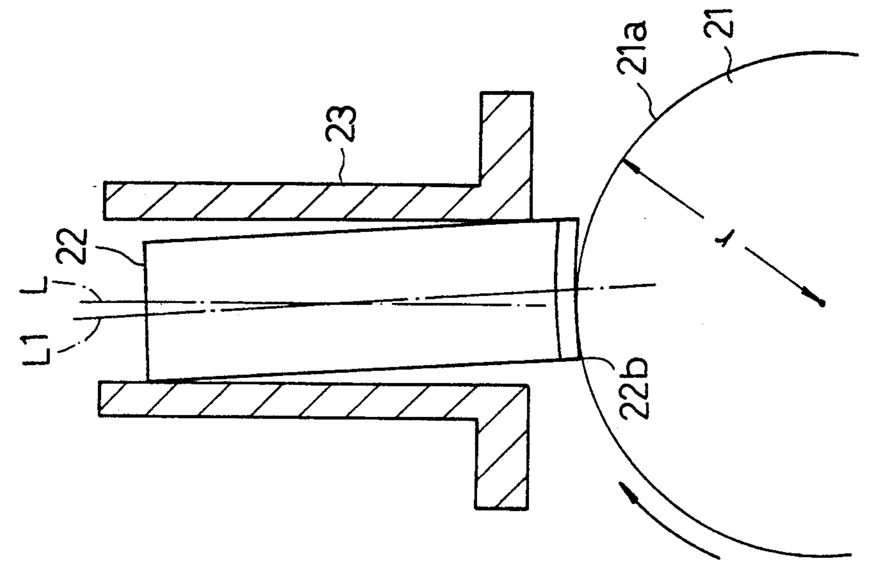
Fig.12 (Prior Art)
FIG. 12 is a cross sectional view illustrating another conventional brush being inclined within the brush holder.
Figure 13:
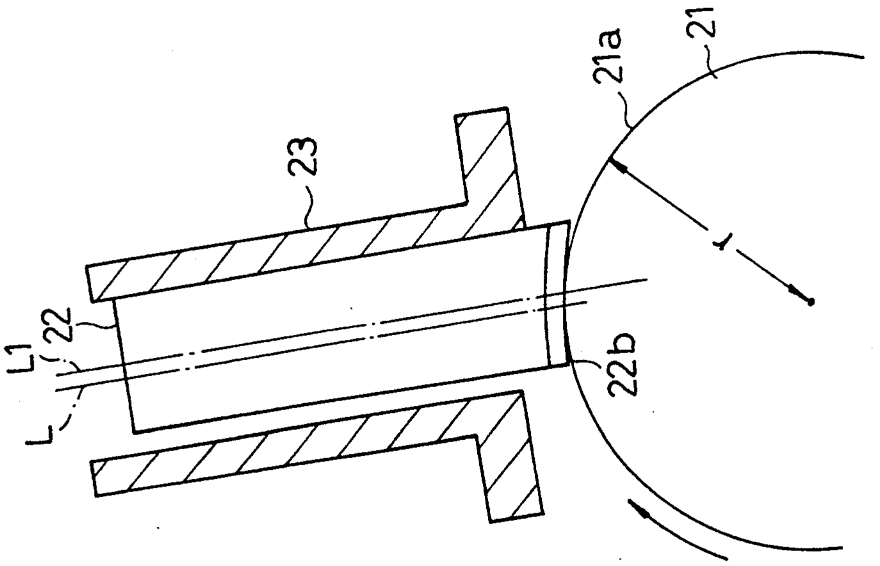
Fig.13 (Prior Art)
FIG. 13 is a cross sectional view illustrating an inclined brush holder in a still another conventional direct current motor.

A direct current motor employed in a third embodiment according to the present invention will now be described referring to FIG. 5, mainly emphasizing the difference relative to the first embodiment. In the present embodiment, a brush holder 42 is inclined by a predetermined angle $\theta$ (for example, 10 to 20 degrees) with respect to the vertical plane which includes a central line 0 of the commutator 1. The spring 44 is similar to that used in the first embodiment.

Further, in the present embodiment, the point P lying on the central line L2 of the sliding contact surface 43*a* of the brush 43, is off-set toward the front side of the rotational direction of the commutator 1, with respect to the central line L of the brush holder 42. The surface 43*a* is formed along an arch Q3, which has a central point 03 that is located on a line X3. The line X3 lies in a plane including the point P and the central line 0 of the commutator 1. The arc Q3 has a larger radius R than the radius r of the commutator 1.

Therefore, while the commutator 1 is rotating, the slidably contacting position between the brush 43 and the commutator 1 always coincides with the central line L2 of the sliding contact surface 43*a*, similar to the above-described embodiments. Therefore, the fluctuation of the motor characteristics is averted. The sliding contact between a corner 43*b* of the brush 43 and the surface 1*a* of the commutator 1 is averted, so that noise generation is minimized.

Although only three embodiments of the present invention have been described herein, it should be apparent to those skilled in the art that the present invention may be embodied in many other specific forms without departing from the spirit or scope of the invention. Particularly, it should be understood that the following embodiments are contemplated by the present invention:

For example, a sliding contact surface of a brush could be formed as a substantially cylindrical tube around the axial line of the commutator. Therefore, the present examples and embodiments are to be considered as illustrative and not restrictive, and the invention is not to be limited to the details giving herein, but may be modified within the scope of the appended claims.

What is claimed is:

1. A brush assembly of a direct current machine including a commutator having an outer periphery, a contact surface on the outer peripheral, and front and rear sides, the commutator being rotatable around a rotation axis, the brush assembly comprising:

brush means having a distal surface being capable of engaging the contact surface of the commutator;

brush holding means for movably holding said brush means and pushing it towards the said commutator, and having a predetermined clearance between said brush means and said brush holding means;

urging means for urging said brush means against the contact surface of the commutator, and for urging said brush means such that at least a distal end portion of said brush means is off-set toward the front side of the rotational direction of the commutator; and said distal surface of the brush means formed along an arc having a center and a brush radius, said center located on a line passing through a middle point of a width of said distal surface and the rotational axis of the commutator, and said brush radius being larger than a radius of the outer periphery of the commutator.

2. The brush assembly according to claim 1, wherein a central line (L) of said brush holding means lies in a plane which includes the rotational axis of the commutator.

3. The brush assembly according to claim 1, wherein a central line (L) of said brush holding means lies in a plane that is different from a plane which includes the rotational axis of the commutator.

4. The brush assembly according to claim 1, wherein said brush means is urged into contact with an inner peripheral surface of said brush holding means.

5. The brush assembly according to claim 2, wherein said brush means is inclined, and a first distal end of said brush means is positioned proximate the commutator, and engages a portion of said brush holding means positioned at the front side of a rotational direction of said commutator; and wherein a second distal end of said brush means is remotely positioned from said commutator and engages a portion of said brush holding means positioned at the rear side of the rotational direction of said commutator.

6. The brush assembly according to claim 1, wherein said urging means includes a coil spring; and wherein a first end of said spring is secured to said brush holding means, and a second thereof engages said brush means.

7. The brush assembly according to claim 1, wherein said urging means is a flat spring which includes a proximal end and a distal end; and wherein said proximal end is secured to said brush holding means, and said distal end engages said brush means.

8. The brush assembly according to claim 1, wherein said distal surface of said brush means is acutely formed and has a larger radius than that of the contact surface of the commutator.

9. The brush assembly according to claim 1, wherein a point lying on a central line of said brush means is off-set toward the front side of rotational direction of said commutator in relation to a central line of said brush holding means.

* * * * *

UNITED STATES PATENT AND TRADEMARK OFFICE
CERTIFICATE OF CORRECTION

PATENT NO. : 5,280,212

DATED : Jan. 18, 1994

INVENTOR(S) : Hiroshi Oba

It is certified that error appears in the above-identified patent and that said Letters Patent is hereby corrected as shown below: On the title page:

Item [73] Assignee: Asmo Co., Ltd.

Signed and Sealed this

Twenty-ninth Day of August, 1995

Attest:

BRUCE LEHMAN

*Attesting Officer* *Commissioner of Patents and Trademarks*